(12) United States Patent
Segawa et al.

(10) Patent No.: US 6,866,828 B2
(45) Date of Patent: Mar. 15, 2005

(54) DISCHARGE ELECTRODE AND PHOTOCATALYSIS APPARATUS

(75) Inventors: Noboru Segawa, Kanagawa-ken (JP);
Yutaka Uchida, Kanagawa-ken (JP);
Takeshi Imamura, Kanagawa-ken (JP);
Naohiko Shimura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 199 days.

(21) Appl. No.: 10/128,660

(22) Filed: Apr. 22, 2002

(65) Prior Publication Data

US 2002/0172628 A1 Nov. 21, 2002

(30) Foreign Application Priority Data

May 17, 2001 (JP) ..................................... P2001-148427

(51) Int. Cl.[7] .............................. B01J 19/08; C25C 7/02
(52) U.S. Cl. ............................ 422/186.04; 422/186.07; 422/186.1; 204/280; 204/284
(58) Field of Search ....................... 422/186.04, 186.07, 422/186.1; 204/280, 284

(56) References Cited

FOREIGN PATENT DOCUMENTS

| EP | 0931 581 A | 7/1999 |
|---|---|---|
| JP | 06146852 | 5/1994 |
| WO | WO0071867 A | 11/2000 |

*Primary Examiner*—Steven Versteeg
(74) *Attorney, Agent, or Firm*—Pillsbury Winthrop LLP (57) ABSTRACT

A photocatalysis apparatus has at least one unit structure (2). The unit structure has a photocatalyst module (6) and a pair of discharge electrodes (5) sandwiching the photocatalyst module. The photocatalyst module includes a photocatalyst and a three-dimensional ceramic mesh base carrying the photocatalyst. At least one of the discharge electrodes is a three-dimensional discharge electrode having an electrode body (3) and a conductive frame (4). The electrode body consists of cells made of a conductive foil and has front, back, and side faces. The front and back faces are separated from each other by a predetermined distance and have a shape selected from a group including a honeycomb, a lattice, and a mesh. The side faces of the electrode body is covered with the conductive frame.

18 Claims, 8 Drawing Sheets

DISCHARGE ELECTRODE AND PHOTOCATALYSIS APPARATUS

CROSS REFERENCE TO RELATED APPLICATIONS

This application is based upon and claims the benefit of priority from the prior Japanese Patent Application No. 2001-148427 filed on May 17, 2001, the entire contents of which are incorporated herein by reference.

BACKGROUND OF THE INVENTION

1. Field of the Invention

The present invention relates to a three-dimensional discharge electrode that effectively and stably discharges, and to a photocatalysis apparatus employing the three-dimensional discharge electrode and a photocatalyst that becomes active when irradiated with light (ultraviolet rays) emitted from the electrode and removes hazardous substances.

2. Description of the Related Art

It is well known that hazardous substances such as dioxins and NOx contained in the atmosphere or water cause environmental pollutions. To effectively remove the hazardous substances, various studies have energetically been made. There are hazardous substances that cause problems in closed spaces, such as putrid gas like ethylene gas in refrigerators, sick-house-syndrome causing chemicals like formaldehyde, toluene, xylene, and aradichlorobenzene in houses, and tobacco fumes in rooms or cabins.

To remove such hazardous substances, discharge apparatuses using electric discharge and photocatalysis apparatuses using photocatalysts have been developed.

Figure 1:
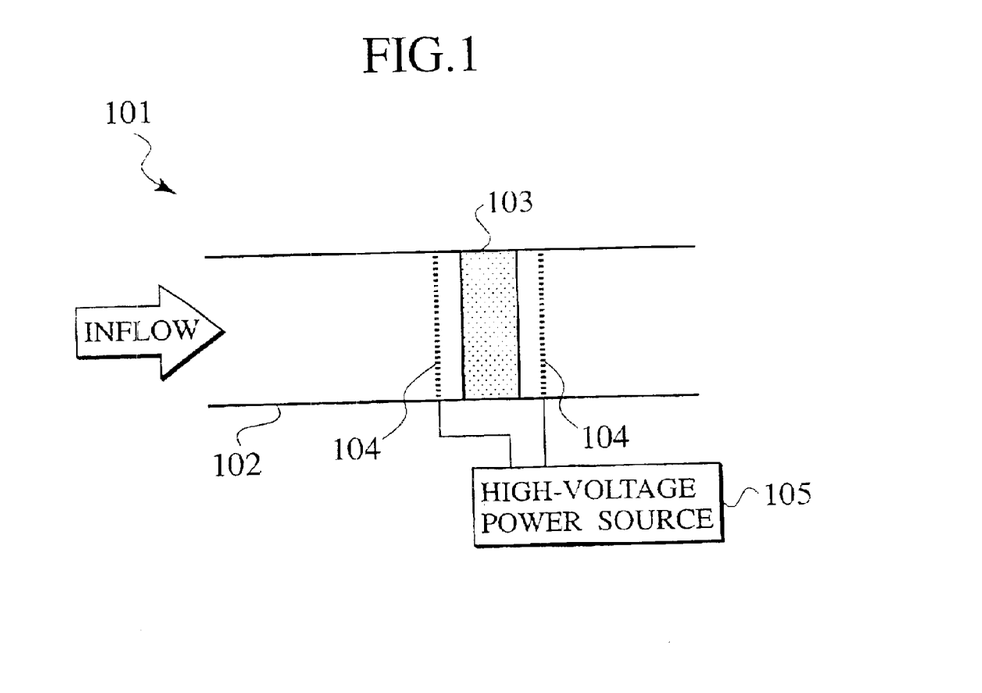
FIG. 1 shows a photocatalysis apparatus according to a related art.

FIG. 1 shows a photocatalysis apparatus 101 according to a related art.

The photocatalysis apparatus 101 has a casing 102, a photocatalyst 103 carrying titanium oxide ($TiO_2$) and housed in the casing 102, a pair of thin-film electrodes 104 arranged on each side of the photocatalyst 103, and a high-voltage power source 105 to apply a high voltage to the electrodes 104. Receiving the high voltage, the electrodes 104 discharge. The discharge produces light (ultraviolet rays) to activate the titanium oxide of the photocatalyst 103. The activated photocatalyst 103 removes hazardous substances from incoming gas. When activated with ultraviolet rays, the photocatalyst 103 produces hydroxy radicals ($.OH$) and super-oxide anions ($.O_2-$). The hydroxy radicals are strongly oxidative to dissociate the molecular. The apparatus 101 uses the oxidizing power of the hydroxy radicals, to chemically remove hazardous substances.

This related art has some problems. The electrodes 104 are made of thin films and are vulnerable to corrosive substances such as hydrogen sulfide, sulfurous acid, nitrous acid, chlorine, and ammonia among hazardous substances to remove.

Once the electrodes 104 corrode due to such corrosive substances, the corroded part carries out no discharge, and therefore, the electrodes 104 unevenly discharge. If the corrosion develops further, the electrodes 104 will become partly nonconductive to worsen the uneven discharge. Then, the photocatalyst 103 will unevenly be activated to provide insufficient catalytic performance.

The thin-film electrodes 104 are unstable when installed. The electrodes 104 must be kept in parallel with each other to maintain the effect and efficiency of the photocatalyst 103.

The electrodes 104 made of thin films easily shift, deform, or break if installed improperly or if exposed to excessive conditions such as a high flow rate of hazardous substances or a large amount of dust. If such trouble occurs, the electrodes 104 will emit insufficient ultraviolet rays for the photocatalyst 103.

SUMMARY OF THE INVENTION

To solve these problems, the present invention provides a photocatalysis apparatus employing three-dimensional discharge electrodes that effectively and stably discharge and a photocatalyst that is activated by light generated by discharge of the discharge electrodes and efficiently and stably removes hazardous substances.

According to a first aspect of the present invention, a three-dimensional discharge electrode has an electrode body and a conductive frame. The electrode body consists of cells made of a conductive foil and has front, back, and side faces. The front and back faces are separated from each other by a predetermined distance and have a shape selected from a group including a honeycomb, a lattice, and a mesh. The conductive frame covers the side faces of the electrode body.

According to a second aspect of the present invention, a photocatalysis apparatus includes a photocatalyst module and a pair of discharge electrodes sandwiching the photocatalyst module. The photocatalyst module has a photocatalyst and a three-dimensional ceramic mesh base carrying the photocatalyst. At least one of the discharge electrodes is a three-dimensional discharge electrode having an electrode body and a conductive frame. The electrode body consists of cells made of a conductive foil and has front, back, and side faces. The front and back faces are separated from each other by a predetermined distance and have a shape selected from a group including a honeycomb, a lattice, and a mesh. The conductive frame covers the side faces of the electrode body.

According to a third aspect of the present invention, a photocatalysis apparatus includes a plurality of unit structures each having a photocatalyst module and a pair of discharge electrodes sandwiching the photocatalyst module. The photocatalyst module includes a photocatalyst and a three-dimensional ceramic mesh base carrying the photocatalyst. At least one of the discharge electrodes is a three-dimensional discharge electrode having an electrode body and a conductive frame. The electrode body consists of cells made of a conductive foil and has front, back, and side faces. The front and back faces are separated from each other by a predetermined distance and have a shape selected from a group including a honeycomb, a lattice, and a mesh. The conductive frame covers the side faces of the electrode body.

DETAILED DESCRIPTION OF EMBODIMENTS

Various embodiments of the present invention will be described with reference to the accompanying drawings.

(First Embodiment)

Figure 2:
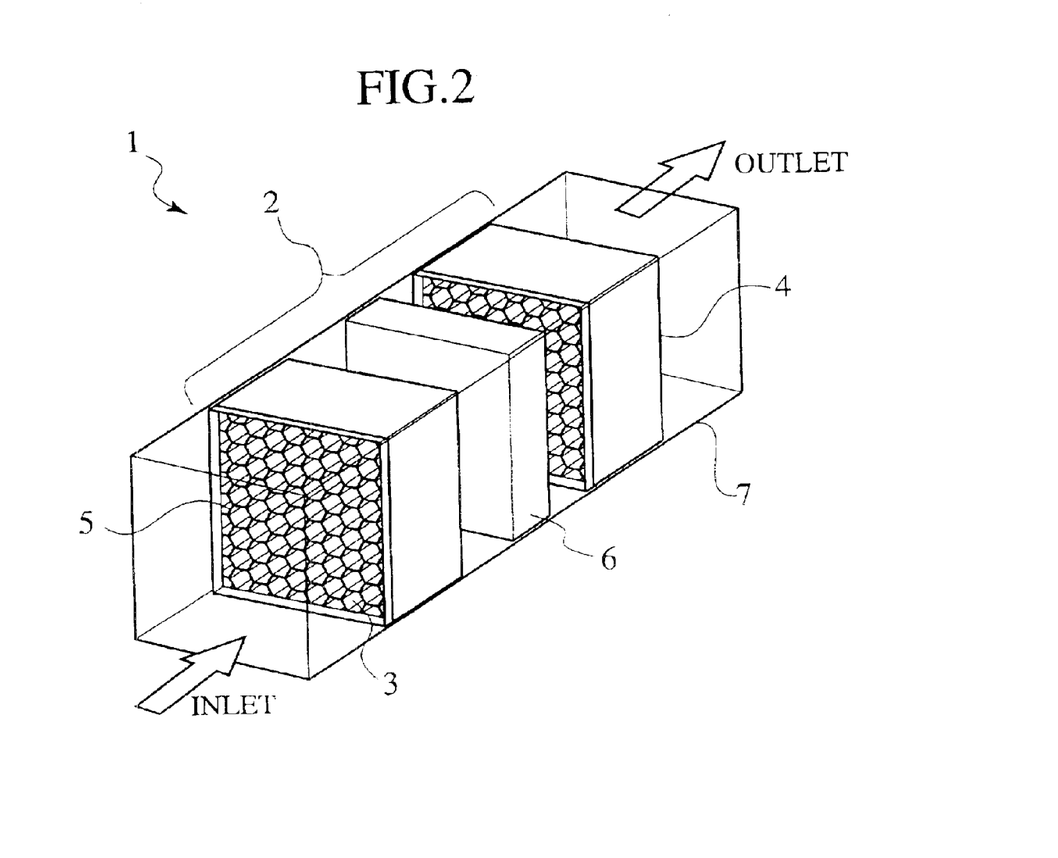
FIGS. 2 and 3 show a photocatalysis apparatus according to a first embodiment of the present invention.
Figure 3:
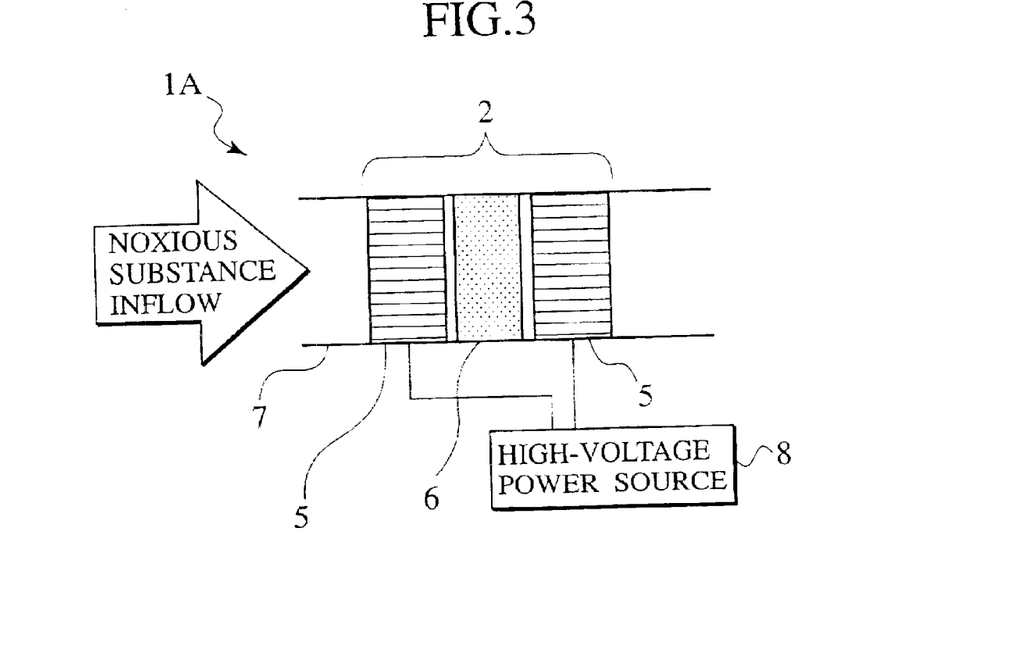

FIGS. 2 and 3 show a photocatalysis apparatus according to the first embodiment of the present invention.

In FIG. 2, the photocatalysis apparatus 1 (1A in FIG. 3) has a unit structure 2 and a casing 7 housing the unit structure 2. The casing 7 is in a pipe shape and has an inlet and an outlet to pass gas containing hazardous substances therethrough. The unit structure 2 includes a pair of honeycomb electrodes 5 and a photocatalyst module 6 sandwiched between the electrodes 5. The electrodes 5 are connected to a high-voltage power source 8 (FIG. 3).

Each electrode 5 is made of an electrode body 3 and a conductive frame 4. The electrode body 3 is a three-dimensional structure formed from cells made of a conductive foil. The electrode body 3 has front, back, and side faces in which the front and back faces are separated from each other by a predetermined distance and have a honeycomb shape, to pass gas containing hazardous substances through the electrode body 3. The side faces of the electrode body 3 are covered with the conductive frame 4.

In FIG. 3, the honeycomb electrodes 5 receive power from the power source 8 and discharge. The electrode body 3 and conductive frame 4 of each electrode 5 are made from stainless steel that is resistive to corrosive substances such as hydrogen sulfide.

When discharging, the electrodes 5 emit light that includes ultraviolet rays (having a wavelength of 185 nm). The ultraviolet rays produce ozone from oxygen contained in the atmosphere. The ozone has deodorizing, decolorizing, disinfecting, and sterilizing functions and is capable of decomposing and removing hazardous substances such as hydrogen sulfide and ammonia. At the same time, the strong oxidizing effect of the ozone oxidizes metal electrodes.

Corrosive substances such as hydrogen sulfide, sulfurous acid, nitrous acid, chlorine, and ammonia also corrode metal electrodes. The electrodes 5, therefore, must be made of or coated with corrosion resistive material.

It is preferable to make the electrode body 3 and conductive frame 4 of each electrode 5 from stainless steel, coated aluminum, coated copper, Hastelloy, platinum, gold, or any other corrosion resistive metal or alloy.

The honeycomb cells of the electrode body 3 may each have a size of 5 mm or greater. The foil that forms the electrode body 3 may have a thickness of 1 mm or thinner, preferably, in the range of 0.1 to 0.2 mm. The reason of this will be explained later.

The photocatalyst module 6 includes a three-dimensional ceramic mesh base whose surface carries semiconductor particles such as $TiO_2$ particles that provide a photocatalysis function. The thickness of the photocatalyst module 6 must be 15 mm or thinner. The reason of this will be explained later.

There are various semiconductor particles that provide the photocatalysis function and are applicable to the photocatalyst module 6. A typical semiconductor providing the photocatalysis function is titanium oxide ($TiO_2$) of anatase, rutile, or brookite type. Other semiconductors that provide the photocatalysis function are metal oxide semiconductors such as $SrTiO_3$, $ZnO$, $BaTiO_3$, $V_2O_5$, and $SnO_2$, element semiconductors such as Si, and compound semiconductors such as GaAs, CdS, and ZnS.

The power source 8 to supply power to the honeycomb electrodes 5 is selected according to the installation conditions of the photocatalysis apparatus 1 (1A). The power source 8 may be a DC power source, a pulse power source to provide short pulses having a duty factor of 0.5 or lower, or an AC power source operating at a frequency of 10 kHz or higher. The power source 8 may be provided with a function of superposing a DC bias of 50% to 90% of a peak value, or a function of intermittent operation.

If the power source 8 is a DC power source, it will realize a simple structure to reduce cost, and low discharge noise to secure a quiet operation.

If the power source 8 is a pulse power source, it will realize high energy, compactness, a simple structure, and cost reduction. The pulse power source easily provides large discharge energy, and therefore, is appropriate for low-cost, middle-size photocatalysis apparatuses.

If the power source 8 is a high-frequency AC power source operating at 10 kHz or higher, discharge energy can be increased in proportion to the operating frequency thereof. Accordingly, the high-frequency AC power source is suitable for photocatalysis apparatuses that need large energy to carry out a deodorizing operation in large scale, or to process highly concentrated substances.

If the power source 8 is combined with a superposed DC bias, it can reduce a pulse voltage and realize compactness. In addition, superposing a DC bias stabilizes the number of incidental atoms that cause discharge, to equalize spark transition voltage and secure a stable operation.

If the power source 8 is a pulse power source or an AC power source, the discharge input energy per pulse or period of the photocatalysis apparatus 1 (1A) is uniquely determined from gas composition and discharge parameters related to an electrode shape and an electrode-to-electrode distance.

Power applied from the power source 8 is expressed as follows:

$$E \times r (W)$$

where E (J) is discharge input energy per pulse or period and r (pps or Hz) is a frequency. To maintain this power irrespective of frequencies, an intermittent operation is needed.

The ratio of operation to non-operation, i.e., a modulation factor of the intermittent operation is expressed as follows:

$$P/(E \times F)$$

where P is the applied power, E is applied energy per pulse or period, and F is a frequency.

With applied power of 10 (W), applied energy per pulse of 50 (mJ), and frequency of 20 (kHz), the modulation factor is as follows:

$$10/(50\times10^{-3}\times20\times10^3)=0.01$$

In this case, an intermittent operation of 10 ms per second is needed.

The intermittent operation is not limited to the 10-ms operation per second. For example it may be a 20-ms operation per two seconds, or two 5-ms operations per second.

If the power source 8 is a DC power source, power applied from the power source 8 is uniquely determined according to discharge parameters. The intermittent operation is effective to lower power consumption without fluctuating voltage.

Operation of the photocatalysis apparatus of FIGS. 2 and 3 will be explained. The power source 8 applies a high voltage to the honeycomb electrodes 5. The electrodes 5 start to discharge to emit light (ultraviolet rays), which uniformly irradiates the photocatalyst module 6 to activate the photocatalyst of the module 6. The activated photocatalyst produces hydroxy radicals (.OH) that are chemically reactive. At the same time, the discharge light produces ozone. The hydroxy radicals and ozone chemically react with hazardous substances entering the unit structure 2 and decompose and remove the hazardous substances.

According to the first embodiment, the side faces of each electrode 5 are covered with the conductive frame 4 and the electrode 5 has a width, to improve corrosion resistivity compared with the thin-film electrodes of the related art.

The honeycomb structure of each electrode 5 secures mechanical accuracy and strength, to keep a fixed distance between the adjacent electrodes 5 for a long time. As a result, the electrodes 5 uniformly and effectively irradiate the photocatalyst module 6 with discharge light so that the module 6 may efficiently and stably show a substance decomposing function for a long time.

According to the first embodiment, ozone produced by discharge chemically reacts with hazardous substances that have not been removed by the photocatalyst module 6 and decomposes and removes them. Namely, the oxidizing power of ozone improves the decomposing efficiency of the photocatalysis apparatus.

If the power source 8 is a DC power source, the electrodes 5 have polarities. In this case, any one of the positive and negative electrodes may be on the inlet side of the photocatalysis apparatus, to provide the effect of the first embodiment.

(Second Embodiment)

Figure 4:
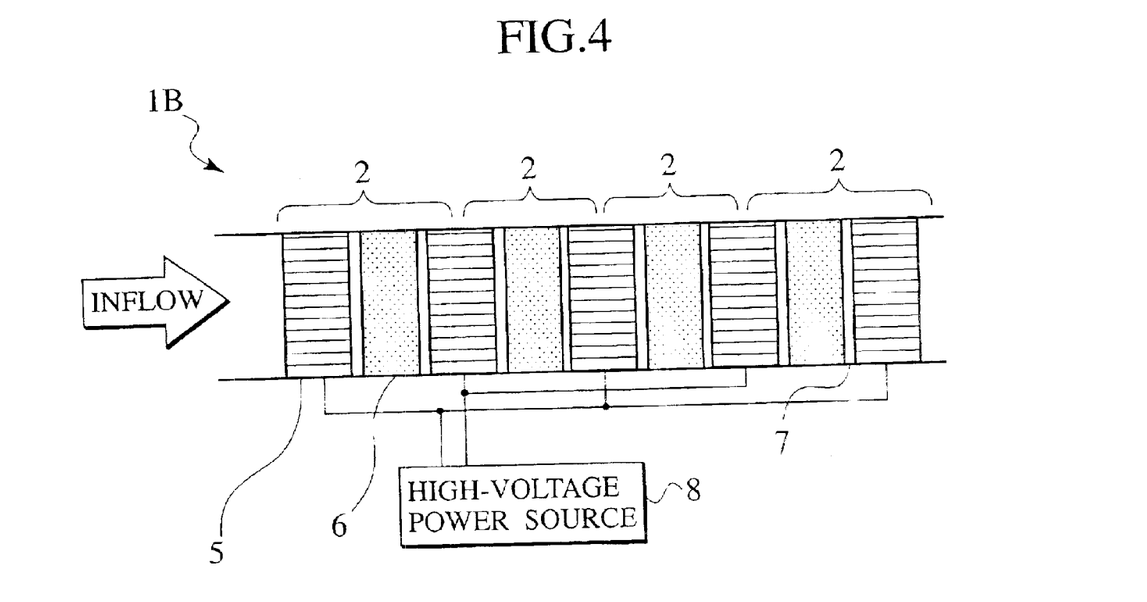
FIG. 4 shows a photocatalysis apparatus according to a second embodiment of the present invention.

FIG. 4 shows a photocatalysis apparatus 1B according to the second embodiment of the present invention. The second embodiment employs a plurality of unit structures each being the unit structure 2 of FIGS. 2 and 3.

The photocatalysis apparatus 1B has a plurality of (four in this example) unit structures 2, a casing 7 accommodating the unit structures 2, and a high-voltage power source 8. Each unit structure 2 has a pair of honeycomb electrodes 5 and a photocatalyst module 6 sandwiched between the electrodes 5. The electrodes 5 are connected to the power source 8.

Two adjacent unit structures 2 share one electrode 5 so that each electrode 5 may efficiently emit light toward the unit structures 2.

The configuration, material, etc., of the electrode 5, photocatalyst module 6, semiconductor catalytic particles of the module 6, and power source 8 are basically the same as those of the first embodiment, and therefore, are not explained again.

Operation of the photocatalysis apparatus 1B will be explained. The power source 8 applies a high voltage to the electrodes 5. The electrodes 5 start to discharge and emit light (ultraviolet rays). The light uniformly irradiates the photocatalyst modules 6 and activates the photocatalysts thereof The activated photocatalysts produce hydroxy radicals (.OH) that are chemically reactive. At the same time, the emitted light produces ozone. The hydroxy radicals and ozone chemically react with hazardous substances flowing through the unit structures 2, to thereby decompose and remove the hazardous substances.

According to the second embodiment, the honeycomb electrodes 5 show corrosion resistance and mechanical accuracy and strength like the first embodiment. The concatenated four unit structures 2 provide decomposing capacity four times greater than the first embodiment.

The number of electrodes 5 of the second embodiment is greater than that of the first embodiment, to produce a larger amount of ozone to promote the oxidization and decomposition of hazardous substances.

(Third Embodiment)

Figure 5:
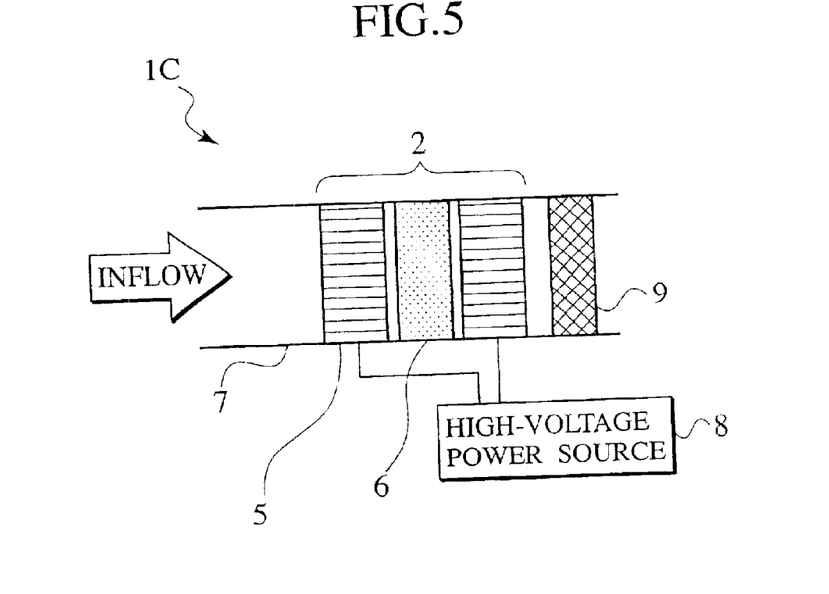
FIG. 5 shows a photocatalysis apparatus according to a third embodiment of the present invention.

FIG. 5 shows a photocatalysis apparatus 1C according to the third embodiment of the present invention. The third embodiment is a combination of the photocatalysis apparatus of the first embodiment and an ozonolysis catalyst 9.

The photocatalysis apparatus 1C has a unit structure 2, the ozonolysis catalyst 9, a casing 7 housing the unit structure 2 and ozonolysis catalyst 9, and a high-voltage power source 8.

The unit structure 2 includes a pair of honeycomb electrodes 5 and a photocatalyst module 6 sandwiched between the electrodes 5. The electrodes 5 are connected to the power source 8. The ozonolysis catalyst 9 is arranged downstream from the unit structure 2 in a gas flowing direction.

The configuration, material, etc., of the electrode 5, photocatalyst module 6, semiconductor catalytic particles of the module 6, and power source 8 are basically the same as those of the first embodiment, and therefore, are not explained again.

According to the first and second embodiments mentioned above, discharge light produces ozone to oxidize, decompose, and remove hazardous substances, and ozone that has not reacted with hazardous substances is discharged as it is. The ozone discharged into the atmosphere is hazardous to human bodies, and therefore, must be decomposed. The ozonolysis catalyst 9 decomposes such unreacted ozone into innocuous oxygen.

The ozonolysis catalyst 9 may employ an optional ozonolysis method depending on conditions. For example, it may employ an activated carbon absorption/decomposition method, a heating decomposition method, a contact decomposition method, a water washing method, a chemical washing method (alkali washing method), or a chemical reduction method.

Operation of the photocatalysis apparatus 1C will be explained. The power source 8 applies a high voltage to the electrodes 5. The electrodes 5 start to discharge and emit light (ultraviolet rays). The light uniformly irradiates the photocatalyst module 6 and activates the photocatalyst thereof. The activated photocatalyst produces hydroxy radicals (.OH) that are chemically reactive. At the same time, the emitted light produces ozone. The hydroxy radicals and ozone chemically react with hazardous substances flowing through the unit structure 2, to thereby decompose and remove the hazardous substances. The ozonolysis catalyst 9 decomposes unreacted ozone into harmless oxygen.

The third embodiment provides the same hazardous substance decomposing performance as the first embodiment. In addition, the ozonolysis catalyst 9 decomposes ozone that has not reacted with hazardous substances, to prevent hazardous ozone from spreading into the atmosphere.

The third embodiment arranges one ozonolysis catalyst 9 on the downstream side of the unit structure 2. An optional number of ozonolysis catalysts may be arranged at optional locations in the photocatalysis apparatus 1F they properly remove ozone.

(Fourth Embodiment)

Figure 6:
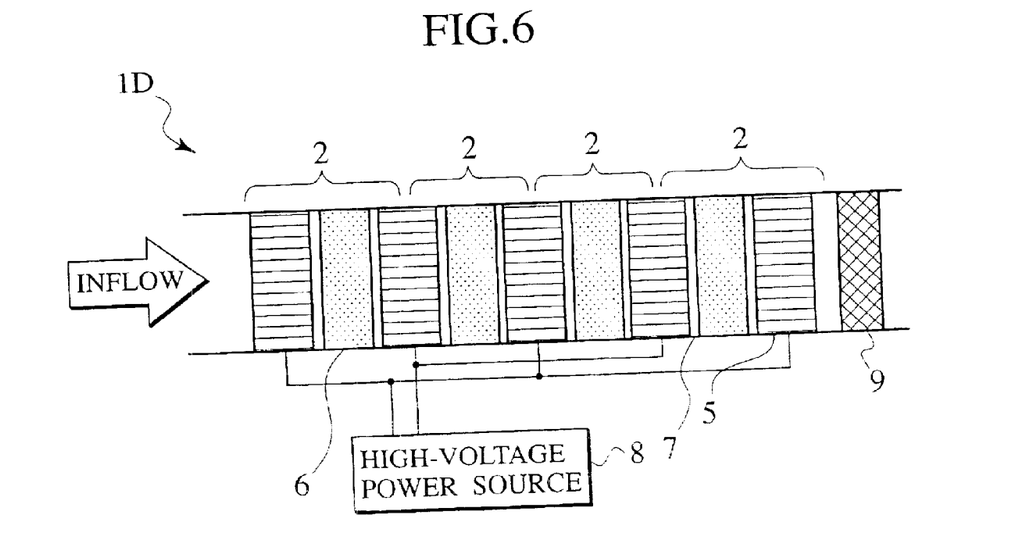
FIG. 6 shows a photocatalysis apparatus according to a fourth embodiment of the present invention.

FIG. 6 shows a photocatalysis apparatus 1D according to the fourth embodiment of the present invention. This embodiment is a combination of the photocatalysis apparatus 1B of FIG. 4 and the ozonolysis catalyst 9 of FIG. 5.

The photocatalysis apparatus 1D has four unit structures 2, an ozonolysis catalyst 9, a casing 7 housing the unit structures 2 and ozonolysis catalyst 9, and a high-voltage power source 8. Each unit structure 2 has a pair of honeycomb electrodes 5 and a photocatalyst module 6 sandwiched between the electrodes 5. The electrodes 5 are connected to the power source 8. The ozonolysis catalyst 9 is arranged downstream from the unit structures 2 in a gas flowing direction.

The configuration, material, etc., of the electrode 5, photocatalyst module 6, semiconductor catalytic particles of the module 6, and power source 8 are basically the same as those of the second embodiment, and therefore, are not explained again.

Operation of the photocatalysis apparatus 1D will be explained. The power source 8 applies a high voltage to the electrodes 5. The electrodes 5 start to discharge and emit light (ultraviolet rays). The light uniformly irradiates the photocatalyst modules 6 and activates the photocatalysts thereof. The activated photocatalysts produce hydroxy radicals (.OH) that are chemically reactive. At the same time, the emitted light produces ozone. The hydroxy radicals and ozone chemically react with hazardous substances flowing through the unit structures 2, to thereby decompose and remove the hazardous substances. The ozonolysis catalyst 9 decomposes unreacted ozone into harmless oxygen.

The fourth embodiment provides the same hazardous substance decomposing performance as the second embodiment. In addition, the ozonolysis catalyst 9 decomposes ozone that has not reacted with hazardous substances, to prevent hazardous ozone from spreading into the atmosphere.

The fourth embodiment arranges one ozonolysis catalyst 9 on the downstream side of the unit structures 2. An optional number of ozonolysis catalysts may be arranged at optional locations in the photocatalysis apparatus if they properly remove ozone.

(Fifth Embodiment)

Figure 7:
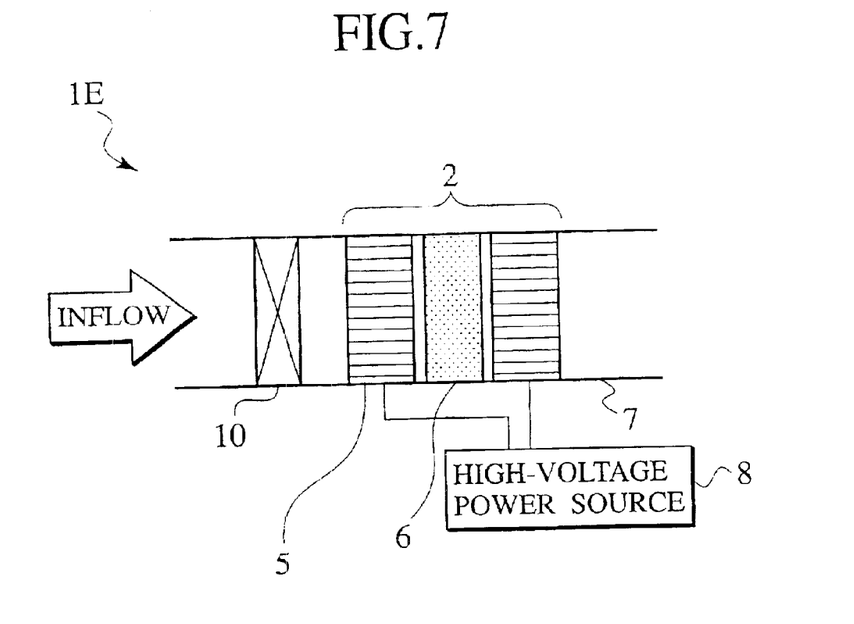
FIG. 7 shows a photocatalysis apparatus according to a fifth embodiment of the present invention.

FIG. 7 shows a photocatalysis apparatus 1E according to the fifth embodiment of the present invention. This embodiment is a combination of the photocatalysis apparatus of FIGS. 2 and 3 and a fan 10.

The photocatalysis apparatus 1E has a unit structure 2, the fan 10, a casing 7 housing the unit structure 2 and fan 10, and a high-voltage power source 8.

The unit structure 2 includes a pair of honeycomb electrodes 5 and a photocatalyst module 6 sandwiched between the electrodes 5. The electrodes 5 are connected to the power source 8. The fan 10 is arranged at an inlet of the photocatalysis apparatus 1E.

The configuration, material, etc., of the electrode 5, photocatalyst module 6, semiconductor catalytic particles of the module 6, and power source 8 are basically the same as those of the first embodiment, and therefore, are not explained again.

The fan 10 is used when a flow rate of gas containing hazardous substances passing through the apparatus 1E is slow, or when the gas must forcibly be circulated. When gas is circulated by free convection, the gas circulation may stop depending on conditions. In this case, the fan 10 is used to forcibly circulate the gas or secure a given flow rate of the gas.

The fan 10 may be arranged at the inlet and/or outlet of the apparatus 1E, or it may be arranged at an optional position. If a plurality of unit structures 2 are employed, the fan 10 may be arranged between every two adjacent unit structures 2. The fan 10 may be arranged between one of the electrodes 5 and the photocatalyst module 6 of the unit structure 2, or in front of an ozonolysis catalyst.

Operation of the photocatalysis apparatus 1E will be explained. The fan 10 forcibly feeds gas containing hazardous substances into the casing 7. The power source 8 applies a high voltage to the electrodes 5. The electrodes 5 start to discharge and emit light (ultraviolet rays). The light uniformly irradiates the photocatalyst module 6 and activates the photocatalyst thereof. The activated photocatalyst produces hydroxy radicals (.OH) that are chemically reactive. At the same time, the emitted light produces ozone. The hydroxy radicals and ozone chemically react with hazardous substances flowing through the unit structure 2, to thereby decompose and remove the hazardous substances.

The fifth embodiment provides the same hazardous substance decomposing performance as the first embodiment. In addition, the fan 10 secures a given flow rate of gas passing through the apparatus 1E, to maintain the substance decomposing capacity of the apparatus 1E for a long time.

(Sixth Embodiment)

Figure 8:
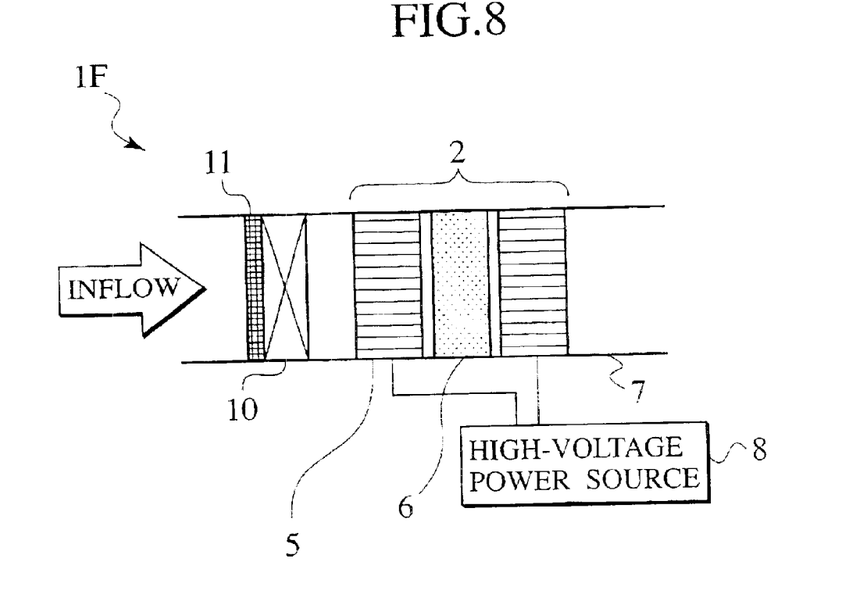
FIG. 8 shows a photocatalysis apparatus according to a sixth embodiment of the present invention.

FIG. 8 shows a photocatalysis apparatus 1F according to the sixth embodiment of the present invention. This embodiment is a combination of the photocatalysis apparatus 1E of the fifth embodiment and a filter 11.

The photocatalysis apparatus 1F has a unit structure 2, a fan 10, the filter 11, a casing 7 housing the unit structure 2, fan 10, and filter 11, and a high-voltage power source 8.

The unit structure 2 includes a pair of honeycomb electrodes 5 and a photocatalyst module 6 sandwiched between the electrodes 5. The electrodes 5 are connected to the power source 8. The fan 10 is arranged at an inlet of the apparatus 1F. The filter 11 is arranged on the inlet side of the fan 10.

The configuration, material, etc., of the electrode 5, photocatalyst module 6, semiconductor catalytic particles of the module 6, and power source 8 are basically the same as those of the first embodiment, and therefore, are not explained again.

When the apparatus 1F is used in an environment containing a lot of dust, the photocatalyst module 6 and electrodes 5 may be clogged or broken. The filter 11 removes dust and substances that may hinder the performance and functions of the electrodes 5 and module 6, to maintain the substance decomposing performance of the apparatus 1F.

Operation of the photocatalysis apparatus 1F will be explained. The filter 11 removes dust from gas containing hazardous substances. The fan 10 forcibly feed the dust removed gas into the casing 7. The power source 8 applies a high voltage to the electrodes 5. Discharge start and emit light (ultraviolet rays). The light uniformly irradiates the photocatalyst module 6 and activates the photocatalyst thereof. The activated photocatalyst produces hydroxy radicals (.OH) that are chemically reactive. At the same time, the emitted light produces ozone. The hydroxy radicals and ozone chemically react with hazardous substances flowing through the unit structure 2, to thereby decompose and remove the hazardous substances.

The sixth embodiment provides the same hazardous substance decomposing performance as the first embodiment. In addition, the filter 11 removes dust and other substances obstructive to the photocatalysis apparatus 1F, to maintain the substance decomposing capacity of the apparatus 1F for a long time.

(Other Embodiments)

The embodiments mentioned above employ honeycomb electrodes. The present invention allows other embodiments.

For example, one of the electrodes 5 of the unit structure 2 may be a thin-film, mesh or thin-wire electrode. The unit structures 2 each having such different electrodes may be concatenated so that the electrodes of different shapes are alternated.

The present invention may employ not only the honeycomb electrodes but also lattice electrodes and mesh electrodes. According to the present invention, a pair of positive and negative electrodes may be the same electrodes or different electrodes. For example, an electrode pair may consist of a honeycomb electrode and a lattice electrode.

According to the present invention, a pair of positive and negative electrodes may have different cell sizes. For example, an electrode pair may consist of a honeycomb electrode having a cell size of 5 mm and a lattice electrode having a cell size of 10 mm.

In addition to the filter 11 of FIG. 8, the photocatalysis apparatus according to the present invention may employ catalysts and absorbents. These catalysts and absorbents are used to remove specific substances, so that the photocatalysis apparatus may remove the remnants. Alternatively, the photocatalysis apparatus removes specific substances, so that the catalysts and absorbents may remove the remnants. Such catalysts and absorbents improve the performance of the photocatalysis apparatus.

The photocatalysis apparatus of any of FIGS. 3 and 4 is applicable to process industrial exhaust gas and clean air. The photocatalysis apparatus of any one of FIGS. 5 and 6 may be incorporated in room air conditioners, car air conditioners, vacuum cleaners, and refrigerators. The photocatalysis apparatus of FIG. 7 may be incorporated in refrigerators that employ natural convection. The photocatalysis apparatus of FIG. 8 is applicable to room air cleaners (in combination with the ozonolysis catalyst of FIG. 5) and smoke separators.

(Tests on Honeycomb Electrodes)

Tests were carried out to examine the characteristics of discharge electrodes, in particular, honeycomb electrodes in the unit structure 2 of FIG. 2. Results of the tests will be explained.

(Performance Comparison Between Present Invention and Related Arts)

(1) Intensity Differences Due to Electrode Structures

To activate and improve a substance decomposing function, a photocatalyst needs strong discharge light (ultraviolet rays having a wavelength of 380 nm or shorter). To produced strong discharge light, a strong electric field is needed. The electric field is dependent on the shapes of discharge electrodes.

Figure 9:
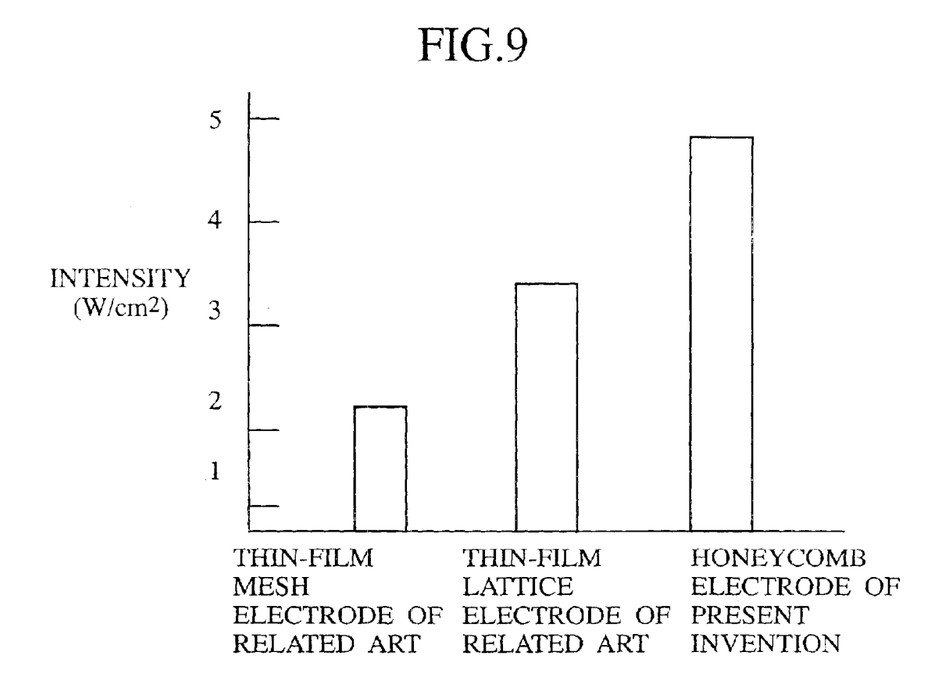
FIG. 9 is a graph showing light intensities from different electrode structures.

FIG. 9 is a graph showing light intensities from thin-film mesh electrodes according to a related art, thin-film lattice electrodes according to a related art, and the honeycomb electrodes of the present invention. These electrodes have the same area and are provided with the same power source (the same input energy). The honeycomb electrodes of the present invention generate discharge light 1.5 to 2 times stronger than the electrodes of the related arts. This means that the present invention is capable of realizing substance decomposing capacity 1.5 to 2 times higher than the related arts with the same power consumption.

(2) Intensity Distribution Differences Due to Electrode Structures

Figure 10:
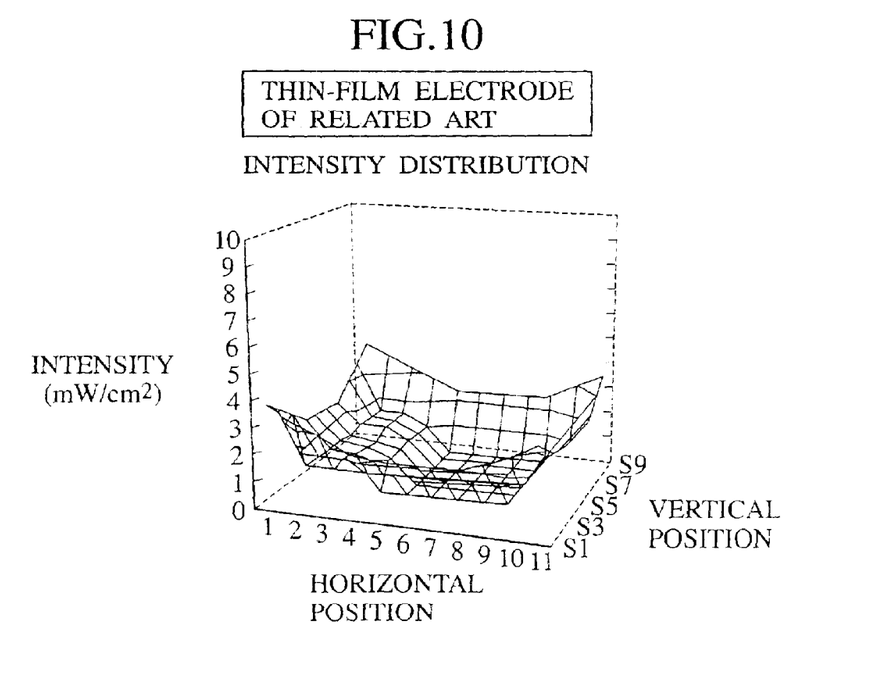
FIG. 10 is a graph showing a distribution of light intensities from thin-film electrodes according to the related art.
Figure 11:
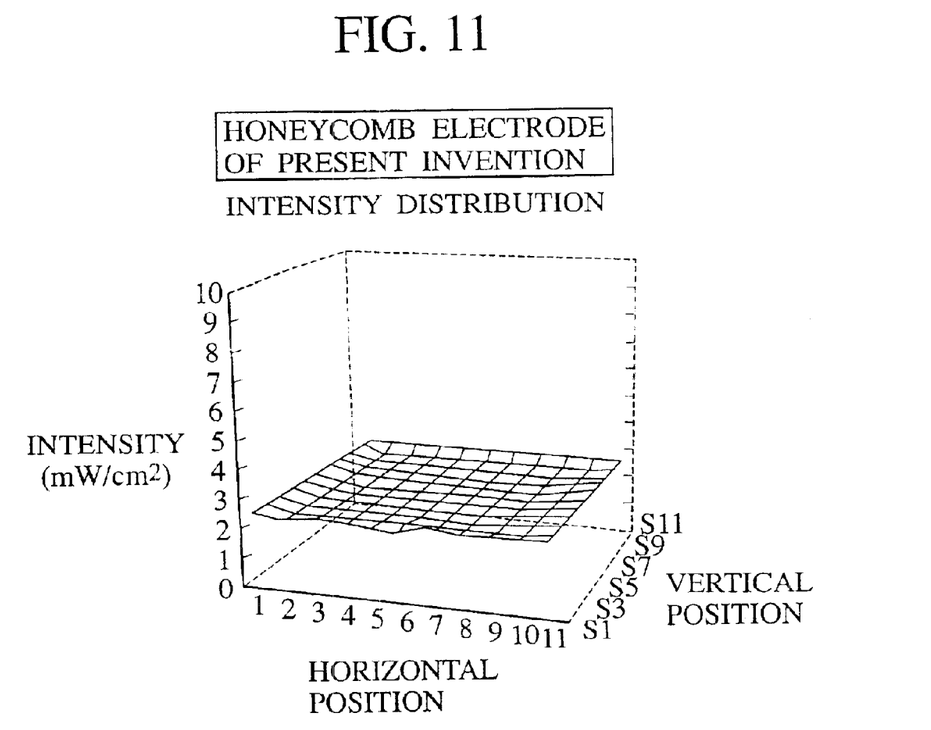
FIG. 11 is a graph showing a distribution of light intensities from honeycomb electrodes according to the present invention.

FIG. 10 is a graph showing an intensity distribution of light from a thin-film electrode according to a related art, and FIG. 11 is a graph showing an intensity distribution of light from the honeycomb electrode of the present invention with the same power source (the same input energy) and the same electrode area.

The related art of FIG. 10 provides intensities sufficient to activate a photocatalyst only along the periphery of the electrode. The related art provides insufficient intensities at the central area of the electrode. Such intensity fluctuations are improper to uniformly activate a photocatalyst.

In FIG. 11, the present invention provides uniform intensities all over the electrode. Compared with the related art, the present invention stably activates a photocatalyst and realizes high decomposing performance.

(Electrode Cell Shape)

(1) Performance and Cell Size

Figure 12:
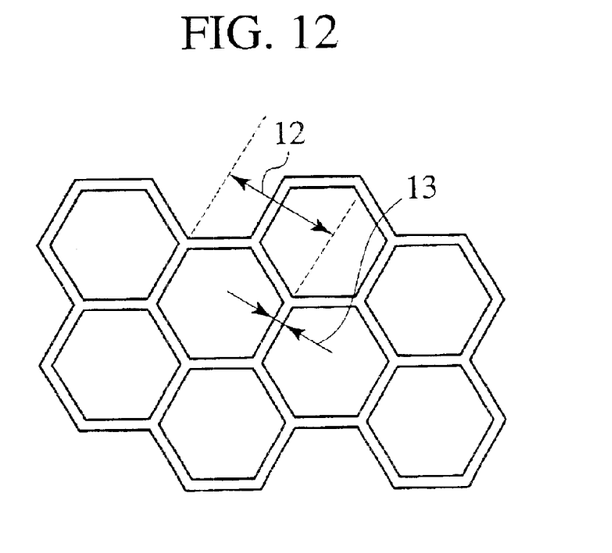
FIG. 12 explains the cell size and foil thickness of a honeycomb electrode according to the present invention.
Figure 13:
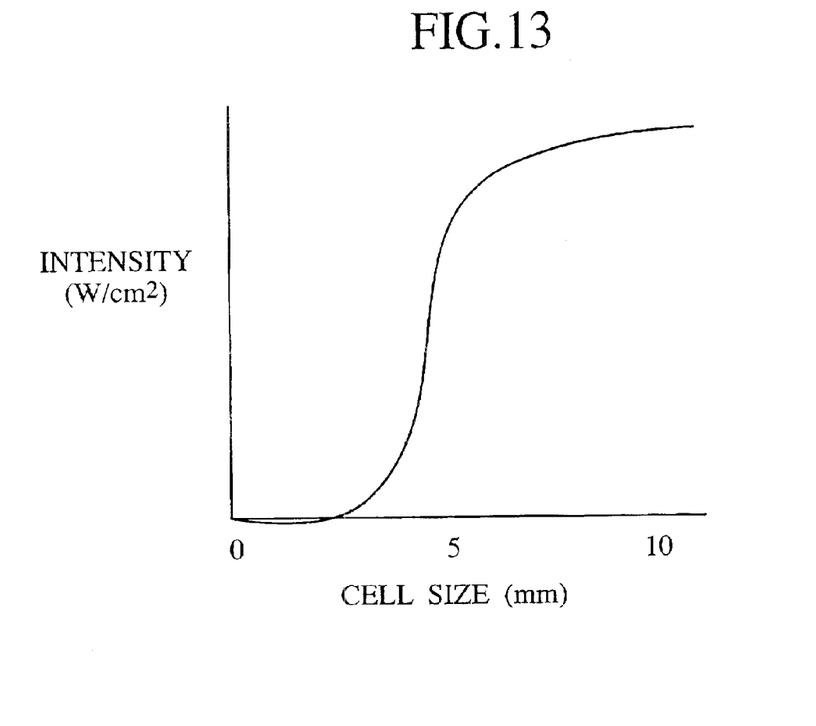
FIG. 13 is a graph showing a relationship between the cell size and intensity of a honeycomb electrode.

The honeycomb electrode of the present invention is composed of honeycomb cells. FIG. 12 explains a cell size 12 of each honeycomb cell. The cell size 12 determines the intensity of light produced by electrode discharge. FIG. 13 is a graph showing a relationship between the cell size and intensity of the honeycomb electrode. When the cell size 12 exceeds 5 mm, the intensity of discharge light steeply increases to realize high decomposing performance.

(2) Performance and Foil Thickness

Figure 14:
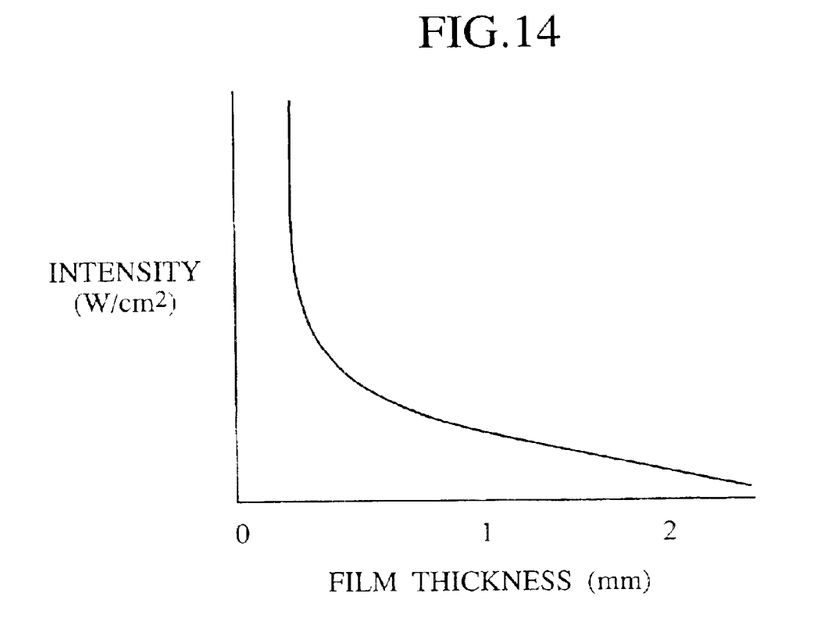
FIG. 14 is a graph showing a relationship between the foil thickness and intensity of a honeycomb electrode.

The honeycomb electrode of the present invention is made of a metal foil as shown in FIG. 12. The thickness 13 of the metal foil determines the intensity of light produced by electrode discharge. FIG. 14 is a graph showing a relationship between the foil thickness and discharge light intensity of the honeycomb electrode. When the foil thickness 13 is in the range of 0.1 to 0.2 mm, the intensity of discharge light steeply increases to realize high decomposing performance.

(Reaching Distance of Discharge Light)

Figure 15:
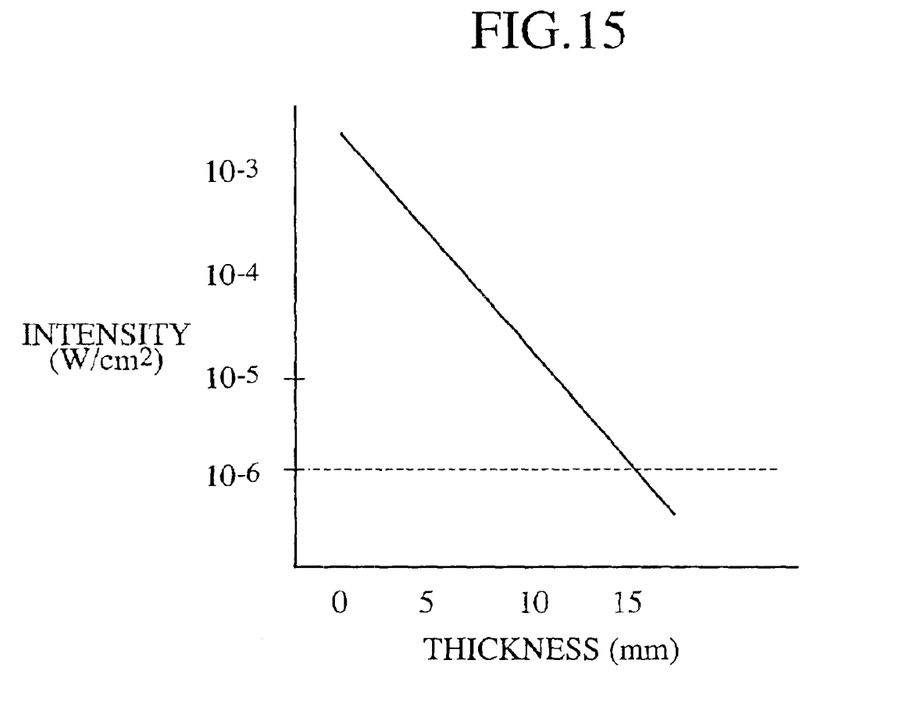
FIG. 15 is a graph showing a relationship between photocatalyst-module thicknesses and light intensities.

To fully exploit the decomposing function of a photocatalyst, it is necessary to uniformly irradiate the photocatalyst with discharge light and make the light penetrate the photocatalyst to the bottom thereof. FIG. 15 is a graph showing a relationship between distance (the thickness of the photocatalyst module 6) and intensity of discharge light.

Generally, light intensity necessary to activate a photocatalyst is $10^{-6}$ W/cm$^2$. As is apparent in FIG. 15, part of the photocatalyst deeper than 15 mm receives insufficient light to activate the photocatalyst. Accordingly, the thickness of the photocatalyst module 6 sandwiched between the three-dimensional electrodes 5 according to the present invention must be 15 mm or thinner, so that the module 6 may wholly show high decomposing capacity.

As explained above, the honeycomb electrode according to the present invention is three-dimensional and has side faces covered with a conductive frame, to improve corrosion resistance. The honeycomb electrode uniformly emits discharge light for a long time.

The electrode according to the present invention secures proper mechanical accuracy and strength, to maintain a given distance to an adjacent electrode for a long time. The electrode of the present invention provides discharge light that uniformly and effectively irradiates a photocatalyst module, to thereby maintain high decomposing capacity for a long time.

The photocatalysis apparatus according to the present invention discharges to emit light while passing gas containing hazardous substances therethrough. The emitted light activates a photocatalyst arranged in the apparatus and produces hydroxy radicals. On the surface of the photocatalyst, the hydroxy radicals chemically react with the hazardous substances and remove the hazardous substances.

The photocatalysis apparatus of the present invention employing a plurality of unit structures each having discharge electrodes and a photocatalyst module is capable of maintaining high decomposing capacity for a long time.

The photocatalysis apparatus according to the present invention produces ozone in addition to hydroxy radicals. The ozone reacts with hazardous substances on the surfaces of the photocatalyst module and electrodes, to surely remove hazardous substances that have not been removed by the photocatalyst module, thereby improving the processing efficiency of the apparatus.

The photocatalysis apparatus of the present invention employing an ozonolysis catalyst decomposes ozone that has not been reacted with hazardous substances, to thereby prevent the hazardous ozone from spreading into the atmosphere.

The photocatalysis apparatus of the present invention employing a fan secures a given flow rate of gas in the apparatus, to maintain the decomposing capacity of the apparatus for a long time.

The photocatalysis apparatus of the present invention employing a filter removes substances obstructive to the apparatus in advance, to stabilize and secure the decomposing capacity of the apparatus for a long time.

The photocatalysis apparatus of the present invention employing a high-frequency AC power source that is intermittently operated efficiently reduces power consumption.

Additional advantages and modifications of the present invention will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-dimensional discharge electrode comprising:
   an electrode body including cells made of a conductive foil, the electrode body having front, back, and side faces, the front and back faces being separated from each other by a predetermined distance and having a shape selected from the group consisting of a honeycomb, a lattice, and a mesh; and
   a conductive frame covering the side faces of the electrode body, wherein the size of each of the cells is about 5 mm at the minimum and the thickness of the foil is 1 mm at the maximum.

2. The discharge electrode of claim 1, wherein:
   the thickness of the foil is in the range of about 0.1 to about 0.2 mm.

3. A photocatalysis apparatus comprising:
   a photocatalyst module including a photocatalyst and a three-dimensional ceramic mesh base carrying the photocatalyst; and
   a pair of discharge electrodes sandwiching the photocatalyst module,
   at least one of the discharge electrodes being a three-dimensional discharge electrode having an electrode body and a conductive frame, the electrode body including cells made of a conductive foil and having front, back, and side faces, the front and back faces being separated from each other by a predetermined distance and having a shape selected from the group consisting of a honeycomb, a lattice, and a mesh, the conductive frame covering the side faces of the electrode body, wherein the size of each of the cells is about 5 mm at the minimum and the thickness of the foil is about 1 mm at the maximum.

4. The photocatalysis apparatus of claim 3, wherein:
   the thickness of the foil is in the range of about 0.1 to about 0.2 mm.

5. The photocatalysis apparatus of claim 3, wherein:
   the thickness of the photocatalyst module is so set as to wholly activate the photocatalyst with discharge light having an intensity of about $10^{-6}$ W/cm$^2$.

6. The photocatalysis apparatus of claim 3, further comprising:
   an ozonolysis catalyst.

7. The photocatalysis apparatus of claim 3, further comprising:
   a fan.

8. The photocatalysis apparatus of claim 3, further comprising:
   a dust removing filter arranged at an inlet of the apparatus.

9. The photocatalysis apparatus of claim 3, further comprising:
   a high-frequency AC power source having a minimum frequency of about 10 kHz and/or intermittently operated.

10. The photocatalysis apparatus of claim 3, further comprising:
    an ozonolysis catalyst;
    a fan;
    a dust removing filter arranged at an inlet of the apparatus; and
    a high-frequency AC power source having a minimum frequency of about 10 kHz and/or intermittently operated.

11. A photocatalysis apparatus comprising:
    a plurality of unit structures each having a photocatalyst module and a pair of discharge electrodes sandwiching the photocatalyst module,
    the photocatalyst module including a photocatalyst and a three-dimensional ceramic mesh base carrying the photocatalyst,
    at least one of the discharge electrodes being a three-dimensional discharge electrode having an electrode body and a conductive frame, the electrode body including cells made of a conductive foil and having front, back, and side faces, the front and back faces being separated from each other by a predetermined distance and having a shape selected from the group consisting of a honeycomb, a lattice, and a mesh, the conductive frame covering the side faces of the electrode body, wherein the size of each of the cells is about 5 mm at the minimum and the thickness of the foil is about 1 mm at the maximum.

12. The photocatalysis apparatus of claim 11, wherein:
    the thickness of the foil is in the range of about 0.1 to about 0.2 mm.

13. The photocatalysis apparatus of claim 11, wherein:

the thickness of the photocatalyst module is so set as to wholly activate the photocatalyst with discharge light having an intensity of about $10^{-6}$ W/cm$^2$.

14. The photocatalysis apparatus of claim 11, further comprising:

an ozonolysis catalyst.

15. The photocatalysis apparatus of claim 11, further comprising:

a fan.

16. The photocatalysis apparatus of claim 11, further comprising:

a dust removing filter arranged at an inlet of the apparatus.

17. The photocatalysis apparatus of claim 11, further comprising:

a high-frequency AC power source having a minimum frequency of about 10 kHz and/or intermittently operated.

18. The photocatalysis apparatus of claim 11, further comprising:

an ozonolysis catalyst;

a fan;

a dust removing filter arranged at an inlet of the apparatus; and a high-frequency AC power source having a minimum frequency of about 10 kHz and/or intermittently operated.

* * * * *